United States Patent
Sugimoto

(10) Patent No.: US 7,468,746 B2
(45) Date of Patent: Dec. 23, 2008

(54) DIGITAL CAMERA

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/757,466

(22) Filed: Jan. 15, 2004

(65) Prior Publication Data

US 2004/0145672 A1 Jul. 29, 2004

(30) Foreign Application Priority Data

Jan. 17, 2003 (JP) ............................... 2003-009990

(51) Int. Cl.
*H04N 5/235* (2006.01)
*H04N 3/14* (2006.01)

(52) U.S. Cl. ................. 348/229.1; 348/224.1; 348/315; 348/363; 348/273; 348/280

(58) Field of Classification Search ............. 348/223.1, 348/254, 362–364, 272–273, 275, 280, 315, 348/241, 255, 235, 237, 224.1, 229.1, 347, 348/349

See application file for complete search history.

(56) References Cited

U.S. PATENT DOCUMENTS

| | | | | |
|---|---|---|---|---|
| 4,437,111 A | * | 3/1984 | Inai et al. ................... | 348/222.1 |
| 5,119,181 A | * | 6/1992 | Perregaux et al. ............ | 348/275 |
| 5,530,474 A | * | 6/1996 | Takei ........................ | 348/224.1 |
| 5,534,922 A | * | 7/1996 | Takeda ....................... | 348/340 |
| 5,699,102 A | * | 12/1997 | Ng et al. ..................... | 347/224 |
| 6,094,220 A | * | 7/2000 | Nakano et al. ............ | 348/223.1 |
| 6,137,100 A | * | 10/2000 | Fossum et al. ............ | 250/208.1 |
| 6,236,434 B1 | * | 5/2001 | Yamada ....................... | 348/315 |
| 6,249,317 B1 | * | 6/2001 | Hashimoto et al. .......... | 348/364 |
| 6,545,710 B1 | * | 4/2003 | Kubo et al. .............. | 348/223.1 |
| 6,646,246 B1 | * | 11/2003 | Gindele et al. ............ | 250/208.1 |
| 6,654,056 B1 | * | 11/2003 | Perregaux et al. ............ | 348/275 |
| 6,674,470 B1 | * | 1/2004 | Tanaka et al. ............... | 348/302 |
| 6,724,426 B1 | * | 4/2004 | Berezin et al. .............. | 348/308 |
| 6,747,694 B1 | * | 6/2004 | Nishikawa et al. ........ | 348/229.1 |
| 6,747,696 B1 | * | 6/2004 | Nakata et al. ............... | 348/243 |

(Continued)

FOREIGN PATENT DOCUMENTS

JP 06-178198 A 6/1994

(Continued)

*Primary Examiner*—Ngoc-Yen Vu
*Assistant Examiner*—Carramah J Quiett
(74) *Attorney, Agent, or Firm*—Birch, Stewart, Kolasch & Birch, LLP

(57) ABSTRACT

A digital camera is provided with: a diaphragm for controlling an amount of incident light; a solid-state imaging element for receiving the incident light passing through the diaphragm, in which a plurality of pixels are arranged in an array shape, and each of the pixels is divided into a main pixel having a large area and a sub-pixel having a small area by an element separating band deviated from a center of the pixel; a synthesizing process unit for synthesizing a high-sensitivity image signal read from the main pixel of each of the pixels with a low-sensitivity image signal read from the sub-pixel; and controller for separately controlling a gain amount for the high-sensitivity image signal and a gain amount for the low-sensitivity image signal in response to a stop-amount of the diaphragm so as to cause the synthesizing process unit to execute the synthesizing operation.

10 Claims, 6 Drawing Sheets

U.S. PATENT DOCUMENTS

| | | | |
|---|---|---|---|
| 6,750,437 B2 * | 6/2004 | Yamashita et al. | 250/208.1 |
| 6,765,611 B1 * | 7/2004 | Gallagher et al. | 348/222.1 |
| 6,778,216 B1 * | 8/2004 | Lin | 348/333.11 |
| 6,801,248 B1 * | 10/2004 | Horiuchi | 348/208.13 |
| 7,382,403 B2 * | 6/2008 | Sakamoto | 348/230.1 |
| 2002/0114531 A1 * | 8/2002 | Torunoglu | 382/255 |
| 2002/0125409 A1 * | 9/2002 | Nagano | 250/208.1 |
| 2004/0017502 A1 * | 1/2004 | Alderson | 348/345 |

FOREIGN PATENT DOCUMENTS

| | | | |
|---|---|---|---|
| JP | 06178198 A | * | 6/1994 |
| JP | 09-205589 A | | 8/1997 |
| JP | 10-136391 A | | 5/1998 |
| JP | 2002250860 A | * | 9/2002 |
| JP | 2002258142 A | * | 9/2002 |
| JP | 2003218343 A | * | 7/2003 |
| JP | 200333421 A | * | 11/2003 |

* cited by examiner

DIGITAL CAMERA

BACKGROUND OF THE INVENTION

This Non-provisional application claims priority under 35 U.S.C. §119(a) on Patent Application No(s). 2003-009990 filed in Japan on Jan. 17, 2003, the entire contents of which are hereby incorporated by reference.

FIELD OF THE INVENTION

The present invention relates to a digital camera equipped with a solid-state imaging element, the respective pixels of which are subdivided into a high-sensitivity pixel (will also be referred to as a "main pixel" hereinafter) having a large area, and a low-sensitivity pixel (will also be referred to as a "sub-pixel" hereinafter) having a small area.

DESCRIPTION OF THE RELATED ART

FIG. 8 is a sectional view for indicating a single pixel of a solid-state imaging element such as a CCD in which a large number of pixels are arranged in an array shape on a surface thereof. A light shielding film 103 having an opening 103a is arranged above a light receiving portion 102 formed on a semiconductor substrate 101 which constitutes this solid-state imaging element. Furthermore, a micro-lens 104 is provided above the light shielding film 103. Light which has been entered into the surface of the solid-state imaging element through both an optical lens system and a diaphragm (which are not shown) of a digital camera is condensed by each of the micro-lenses 104, and then, the condensed light is entered through the opening 103a of the light shielding film 103 into the light receiving portion 102 of each of the pixels.

FIG. 9(a) is a diagram for indicating a confusion circle in each pixel when the diaphragm of the digital camera is set to an open side, namely an F-number becomes small, and FIG. 9(b) is a diagram for showing a confusion circle in each pixel when the diaphragm of the digital camera is set to a small-stop side, namely an F-number becomes large. Light which is indicated by a dot/dash line in FIG. 8 corresponds to incident light when the diaphragm is set to the open side, and as shown in FIG. 9(a), the confusion circle 105a thereof is widened by the opening 103a of the light shielding film 103, so that a portion of this incident light is not reached to the light receiving portion 102 and thus a light amount loss occurs. In contrast to the above case, light 106 which is indicated by a solid line shown in FIG. 8 corresponds to incident light when the diaphragm is set to the small-stop side, and as represented in FIG. 9(b), the entire confusion circle 106a thereof is entered within the opening 103a of the light shielding film 103, so that a light amount loss does not occur.

As explained above, since the light amount loss may occur in response to the diaphragm in the digital camera, as indicated in FIG. 10, when the diaphragm is set to such an open side which is smaller than, or equal to a certain F-number, there is such a problem that a relative sensitivity is lowered.

To solve this problem, as explained in Japanese Laid-open Patent Application No. HEI-6-178198 (Japanese Laid-open Patent Application No. HEI-6-178198), the conventional digital camera performs the sensitivity correcting operation of the solid-state imaging element in response to the stop amount.

Such a technical idea has been proposed to a solid-state imaging element which is mounted on a digital camera, in which each of pixels thereof is subdivided into a high-sensitivity pixel having a large area and a low-sensitivity pixel having a small area. In this digital camera, image data photographed by the high-sensitivity pixel is synthesized with image data photographed by the low-sensitivity pixel so as to realize a wide dynamic range of an image.

Even in a digital camera on which a solid-state imaging element capable of realizing such a wide dynamic range is mounted, since a light amount loss occurs in response to a stop amount of a diaphragm, a sensitivity correcting operation is required in a similar manner as explained in FIG. 8 and FIG. 9. However, since each of the pixels in the above-described solid-state imaging element of the patent publication 1 is not subdivided into the high-sensitivity pixel and the low-sensitivity pixel, this sensitivity correcting technique cannot be directly applied to the digital camera which mounts thereon the solid-state imaging element where each of the pixels thereof has been subdivided into the high-sensitive pixel and the low-sensitive pixel.

Also, there is another problem. That is, since the S/N ratio of the stored electron charges of the low-sensitivity pixel is deteriorated as compared with that of the high-sensitivity pixel, when the high-sensitivity image signal is simply synthesized with the low-sensitivity image signal, there is a risk that the synthesized image having the large amount of noise is produced.

SUMMARY OF THE INVENTION

A first object of the present invention is to provide a digital camera capable of correcting sensitivities of a solid-state imaging element in a proper manner, in which each of pixels thereof has been subdivided into a high-sensitivity pixel having a large area and a low-sensitivity pixel having a small area.

A second object of the present invention is to provide a digital camera capable of producing a synthesized image having less noise component.

A digital camera capable of achieving the above-described first object is featured by comprising: a diaphragm for controlling an amount of incident light; a solid-state imaging element for receiving the incident light which has passed through the diaphragm, in which a plurality of pixels are arranged in an array shape, and each of the pixels is divided into a main pixel having a large area and a sub-pixel having a small area by an element separating band deviated from a center of the pixel; synthesizing process means for synthesizing a high-sensitivity image signal read from the main pixel of each of the pixels with a low-sensitivity image signal read from the sub-pixel; and control means for separately controlling a gain amount for the high-sensitivity image signal and a gain amount for the low-sensitivity image signal in response to a stop-amount of the diaphragm so as to cause the synthesizing process means to execute the synthesizing operation.

With employment of this structure, the sensitivity of the image signal produced from the main pixel and the sensitivity of the image signal produced from the sub-pixel can be corrected in a proper manner, while the sensitivity characteristics of both the main pixel and the sub-pixel are different from each other with respect to the stop amount of the diaphragm, so that a synthesized image having a superior image quality can be produced.

The above-described control means of the digital camera according to the present invention is featured in that the control means increases the gain amount of the high-sensitivity image signal and decreases the gain amount of the low-sensitivity image signal when the diaphragm is set to an open side, whereas the control means decreases the gain amount of the high-sensitivity image signal and increases the gain amount of the low-sensitivity image signal when the diaphragm is set to a small-stop side.

With employment of this structure, the sensitivity of the image signal produced from the main pixel and the sensitivity of the image signal produced from the sub-pixel can be corrected in an optimum manner, while the sensitivity characteristics of both the main pixel and the sub-pixel are different from each other with respect to the stop amount of the diaphragm, so that a synthesized image having a superior image quality can be produced.

The above-described control means of the digital camera according to the present invention is featured in that when the control means increases the gain amount of the low-sensitivity image signal, the control means decreases a synthesizing ratio of the low-sensitivity image signal which is synthesized with the high-sensitivity image signal.

With employment of this structure, when the gain amount of the low-sensitivity image signal read from the sub-pixel having the large noise amount is increased, the synthesizing ratio of the low-sensitivity image signal with respect to the high-sensitivity image signal is lowered. As a result, it is possible to avoid such a fact that the synthesized image having the noise component is produced, and also possible to achieve the above-described second object.

A digital camera capable of achieving the above-explained second object is featured by comprising: a diaphragm for controlling an amount of incident light; a solid-state imaging element for receiving the incident light which has passed through the diaphragm, in which a plurality of pixels are arranged in an array shape, and each of the pixels is divided into a main pixel having a large area and a sub-pixel having a small area by an element separating band deviated from a center of the pixel; synthesizing process means for synthesizing a high-sensitivity image signal read from the main pixel of each of the pixels with a low-sensitivity image signal read from the sub-pixel; and control means operated in such a manner that when the synthesizing process means performs the synthesizing operation of the image signals, the smaller a stop amount of the diaphragm becomes, the smaller a synthesizing ratio of the low-sensitivity image signal with respect to the high-sensitivity image signal is decreased.

With employment of this structure, in such a case that the incident light amount with respect to the sub-pixel is furthermore decreased by the diaphragm and thus the S/N ratio of the stored electron charges thereof is deteriorated, since the synthesizing ratio of the low-sensitivity image signal with respect to the high-sensitivity image signal is lowered, the noise amount of the synthesized image can be reduced.

DESCRIPTION OF THE PREFERRED EMBODIMENT

Referring now to drawings, an embodiment of the present invention will be described.

Figure 1:
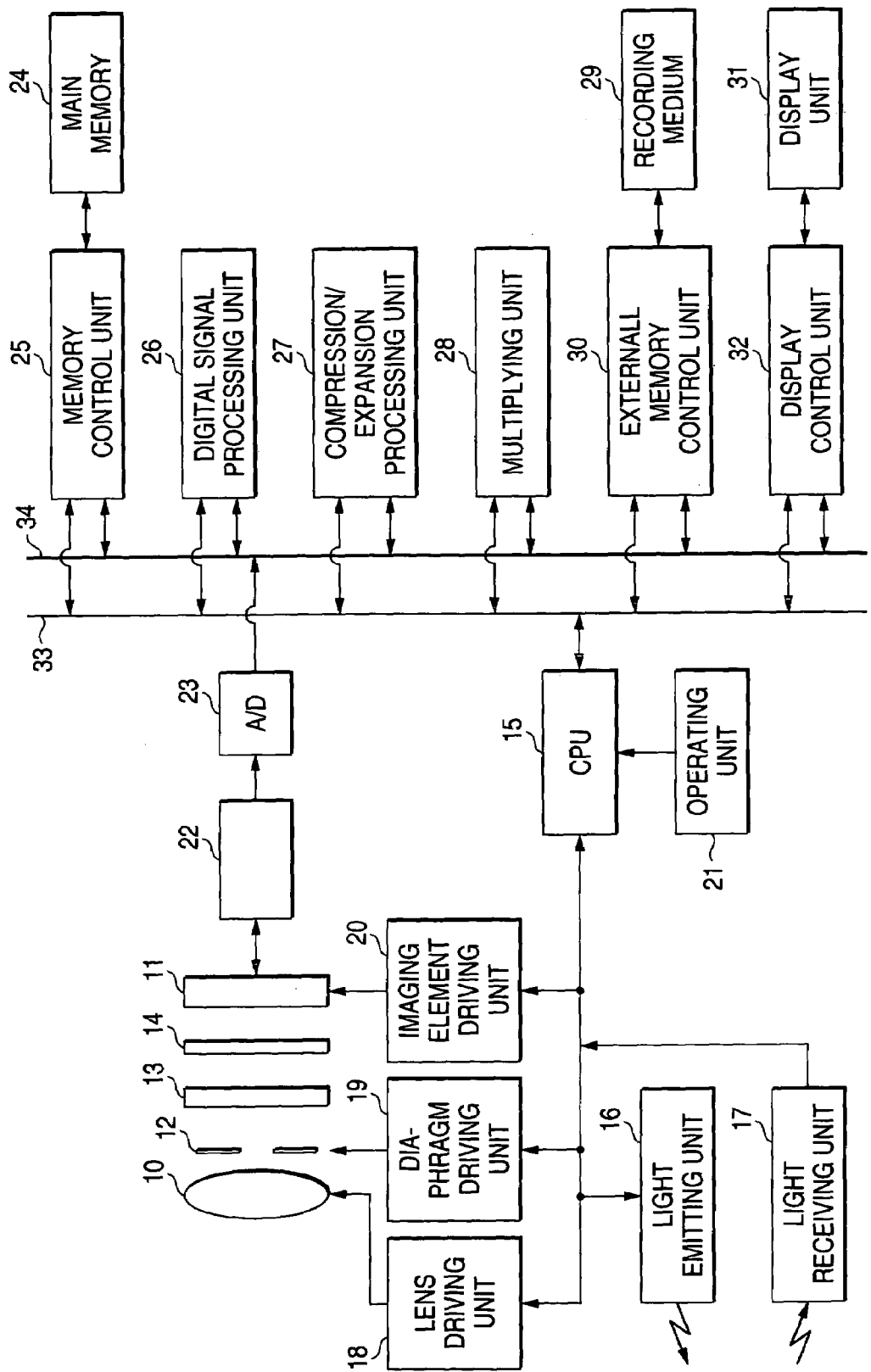
FIG. 1 is a structural diagram of a digital still camera according to a first embodiment of the present invention.

FIG. 1 is a structural diagram for showing a digital still camera according to a first embodiment of the present invention. Although the digital still camera is explained as an example in this embodiment, the present invention may be applied to other sorts of digital cameras such as digital video cameras, and cameras which are mounted on compact electronic appliances such as portable telephones.

The digital still camera shown in FIG. 1 is equipped with a photographing lens 10, a solid-state imaging element 11, a diaphragm 12 provided between both the imaging lens 10 and the solid-state imaging element 11, an infrared-ray cutting filter 13, and an optical low-pass filter 14. A CPU 15 which controls an entire unit of the digital still camera controls both a light emitting unit 16 and a light receiving unit 17 for an electronic flash unit (not shown). Also, the CPU 15 controls a lens driving unit 18 so as to adjust a position of the photographing lens 10 to a focusing position, and controls an aperture amount of the diaphragm 12 via a diaphragm driving unit 19 in order that an exposure amount becomes a proper exposure amount.

Also, the CPU 15 drives the solid-state imaging element 11 via an imaging element driving unit 20 so as to output an image of a photographic subject as a color signal, which has been imaged through the photographing lens 10. Also, while an instruction signal issued by a user is entered via an operating unit 21 into the CPU 15, the CPU 15 performs various sorts of control operations in response to this instruction signal.

An electric control system of the digital still camera is equipped with an analog signal processing unit 22 connected to an output terminal of the solid-state imaging element 11, and an A/D converting circuit 23. The A/D converting circuit 23 A/D-converts an RGB color signal outputted from this analog signal processing unit 22 into a digital signal. These analog signal processing unit 22 and the A/D converting circuit 23 are controlled by the CPU 15.

Furthermore, the electric control system of this digital still camera is equipped with a memory control unit 25, a digital signal processing unit 26, a compression/expansion processing unit 27, a multiplying unit 28, an external memory control unit 30, and a display control unit 32. The memory control unit 25 is connected to a main memory 24. A detailed operation of the digital signal processing unit 26 will be explained later. The compression/expansion processing unit 27 compresses a photographed image to obtain a JPEG image, and/or expands a compressed image. The multiplying unit 28 multiplies photometric data with each other so as to adjust a gain of a white balance. A detachably-mounted recording medium 29 is connected to the external memory control unit 30. A liquid crystal display unit 31 mounted on a rear surface, and the like of the digital still camera is connected to the display control unit 32. These structural units are connected to each other via both a control bus 33 and a data bus 34, and are controlled based upon commands issued from the CPU 15.

It should be understood that the digital signal processing unit 26, the analog signal processing unit 22, the A/D converting circuit 23, and the like shown in FIG. 1 may be mounted on the digital still camera as separate circuits. Alternatively, it is better to manufacture these electronic units on the same semiconductor substrate as the solid-state imaging element 11 by employing an LSI manufacturing technique to be formed as a single solid-state imaging apparatus.

Figure 2:
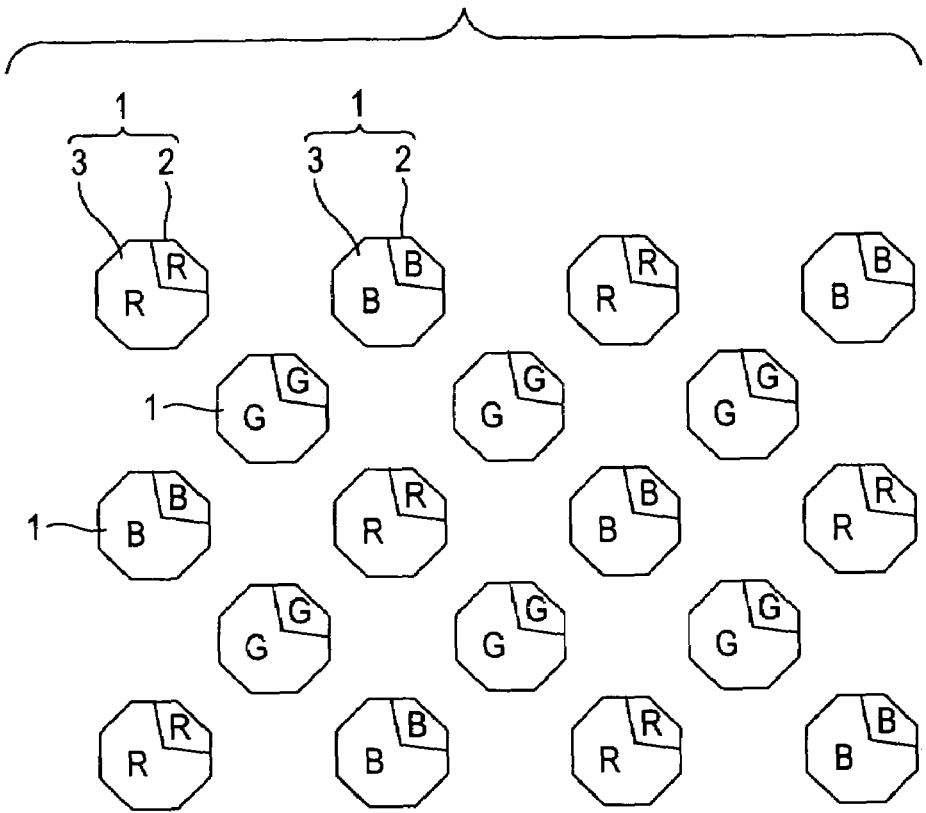
FIG. 2 is a diagram for schematically showing a surface of a solid-state imaging element indicated in FIG. 1.

FIG. 2 is an element arranging diagram of the solid-state imaging element 11 used in this embodiment. Pixels 1 of a CCD portion which image an image having a wide dynamic range employ a pixel arrangement described in, for instance, Japanese Laid-open Patent Application No. HEI-10-136391. The respective pixels of odd-numbered column are arranged in such a manner that these pixels are shifted by a ½ pitch along a horizontal direction with respect to the respective pixels of even-numbered columns. Also, vertical transfer paths (not shown) which transfer signal electron charges read out from the respective pixels are arranged in a zigzag line in such a manner that these vertical transfer paths escape from the respective pixels along the vertical direction.

Then, each of the pixels 1 according to this first embodiment is provided in the example shown in FIG. 2 in such a manner that each pixel 1 is subdivided into a low-sensitivity pixel 2 and a high-sensitivity pixel 3. The low-sensitivity pixel 2 occupies approximately ⅕ of an entire area of this pixel 1, whereas the high-sensitivity pixel 3 occupies the remaining area thereof, namely approximately ⅘ of the entire area. While signal electron charges of the respective low-sensitivity pixels 2 are discriminated from signal electron charges of the respective high-sensitivity pixels 3, these signal electron charges can be read to the above-explained vertical transfer paths and then can be transferred. It is so determined that the pixel 1 is subdivided based upon which ratio and which position based upon in a design choice. FIG. 2 simply indicates an exemplification of such pixels.

Figure 3:
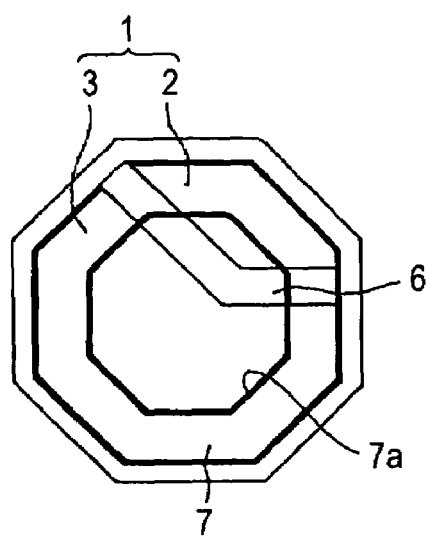
FIG. 3 is a detailed upper view of a single pixel shown in FIG. 2.

FIG. 3 is an upper view for indicating one pixel structure of the pixel 1 of FIG. 2 in detail. The pixel 1 is divided into both a main pixel 3 and a sub-pixel 2 by an element separating band 6. The element separating band 6 performs an element division in such a manner that this element separating band 6 passes through a position deviated from a central point of the pixel 1, so that the sub-pixel 2 is formed in such a way that this sub-pixel 2 is eccentrically located at a peripheral portion of the pixel 1. A light shielding film 7 having an opening 7a is arranged on an upper portion of the pixel 1, and furthermore, a micro-lens (not shown) is further arranged on this light shielding film 7.

It should also be noted that as to the solid-state imaging element 11, the CCD having such a honeycomb pixel arrangement as shown in FIG. 2 has been explained. Alternatively, either a bayer type CCD or a bayer type CMOS sensor may be employed.

Figure 4:
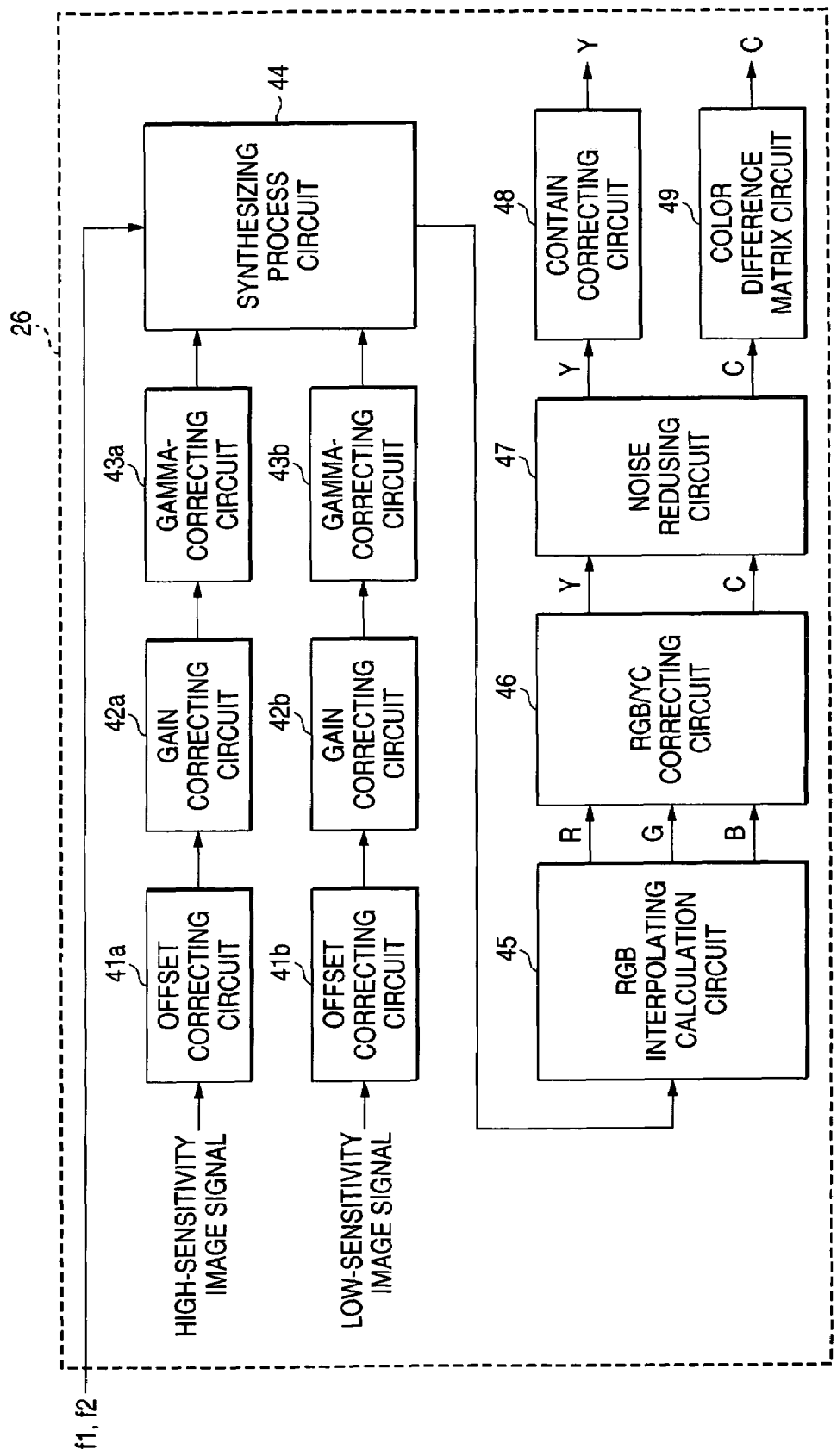
FIG. 4 is a process structural diagram of the digital signal processing unit shown in FIG. 1.

FIG. 4 is a process structural diagram of the digital signal processing unit 26. This digital signal processing unit 26 employs such a logarithmic adding system that after a high-sensitivity image signal and a low-sensitivity image signal are gamma-corrected respectively, the gamma-corrected high-sensitivity image signal is added to the gamma-corrected low-sensitivity image signal. The high-sensitive image signal is read out from the main pixel 3, whereas the low-sensitive image signal is read out from the sub-pixel. The digital signal processing unit 26 is provided with an offset correcting circuit 41a, a gain correcting circuit 42a, a gamma correcting circuit 43a, another offset correcting circuit 41b, another gain correcting circuit 42b, and another gamma correcting circuit 43b. The offset correcting circuit 41a performs an offset process operation by acquiring RGB color signals made of digital signals of a high-sensitivity image which is outputted from the A/D converting circuit 23 shown in FIG. 1. The gain correcting circuit 42a adjusts a white balance as to the output signals of the offset correcting circuit 41a. The gamma correcting circuit 43a performs a gamma correction with respect to the color signals after being gamma-corrected. The offset correcting circuit 41b performs an offset process operation by acquiring RGB color signals made of digital signals of a low-sensitivity image which is outputted from the A/D converting circuit 23 shown in FIG. 1. The gain correcting circuit 42b adjusts a white balance as to the output signals of the offset correcting circuit 41b. The gamma correcting circuit 43b performs a gamma correction with respect to the color signals after being gamma-corrected. In such a case that a linear matrix process operation and the like are carried out with respect to the signals after being gamma-corrected, this linear matrix process operation is carried out between the gain correcting circuits 42a/42b and the gamma correcting circuits 43a/43b.

The digital signal processing unit 26 is further provided with an image synthesizing process circuit 44, an RGB interpolating calculation unit 45, an RGB/YC converting circuit 46, a noise filter 47, a contour correcting circuit 48, and a color difference matrix circuit 48. The image synthesizing process circuit 44 acquires both the RGB color signals outputted from the respective gamma correcting circuits 43a and 43b, and performs an image synthesizing process operation with respect to the acquired output signals. The RGB interpolating calculation unit 45 interpolates the RGB color signals after being image-synthesized so as to acquire 3 color (RGB) signals at the respective pixel positions. The RGB/YC converting circuit 46 acquires a luminance signal "Y", and color difference signals "Cr" and "Cb" from the RGB color signals. The noise filter 47 reduces noise from the luminance signal "Y", and the color difference signals "Cr" and "Cb." The contour correcting circuit 48 performs a contour correcting operation with respect to the luminance signal "Y" obtained after the noise reducing operation has been carried out. The color difference matrix circuit 48 multiplies a color difference matrix with respect to the color difference signals "Cr" and "Cb" so as to execute a color tone correction.

The above-described image synthesizing process circuit 44 acquires the high-sensitivity image signal outputted from the gamma correcting circuit 43a and the low-sensitivity image signal outputted from the gamma correcting circuit 43b, and furthermore, acquires both a gain "f1" and another gain "f2", and then, performs an image synthesizing operation with respect to these acquired image signals and gains in the unit of a pixel in accordance with the below-mentioned expression 1, and thereafter outputs the image synthesized result. The gain "f1" is set with respect to a high-sensitivity image signal, and the gain "f2" is set with respect to a low-sensitivity image signal, which have been determined based upon F-numbers of a diaphragm 12 by the CPU 15.

$$\text{data} = f1 \cdot \text{high} + f2 \cdot \text{low} \qquad \text{[Expression 1]}$$

In this expression 1, symbols are given as follows:

high: data obtained after high-sensitivity image signal has been gamma-corrected;

low: data obtained after low-sensitivity image signal has been gamma-corrected;

f1: gain with respect to "high"; and f2: gain with respect to "low."

Figure 5:
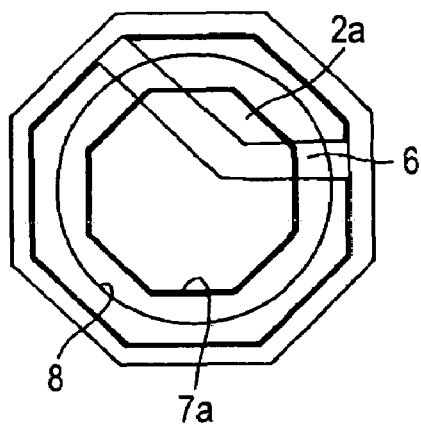
FIG. 5(a) is a diagram for representing a positional relationship between a confusion circle of incident light and an opening of a light shielding film when a diaphragm for one pixel shown in FIG. 3 is set to an open side.
FIG. 5(b) is a diagram for representing a positional relationship between a confusion circle of incident light and an opening of a light shielding film when a diaphragm is set to a small-stop side.
Figure 5:
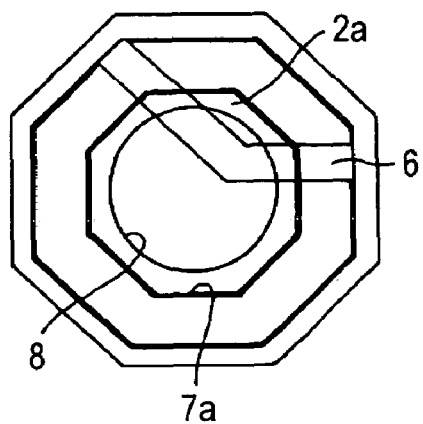

Next, a sensitivity correction of the digital camera according to this first embodiment will now be explained with reference to FIG. 5. FIG. 5(a) is a diagram for showing a confusion circle 8 in each pixel 1 when the diaphragm 12 is set to the open side, namely the F-number is small. FIG. 5(b) is a diagram for representing a confusion circle 9 in each pixel 1 when the diaphragm 12 is set to the small-stop side, namely the F-number is large.

In the solid-state imaging element 11 of this first embodiment, in such an arrangement that the sub-pixel 2 is divided from the main pixel 3 in such a manner that the sub-pixel 2 is eccentrically located in the peripheral portion of the pixel 1, when the light shielding film 7 is arranged on this upper portion, the opening portion 2a of the sub-pixel 2 which is observed from the opening 7a of the light shielding film 7 having a smaller area than that of the pixel 1 is eccentrically located around the opening 7a.

Figure 10:
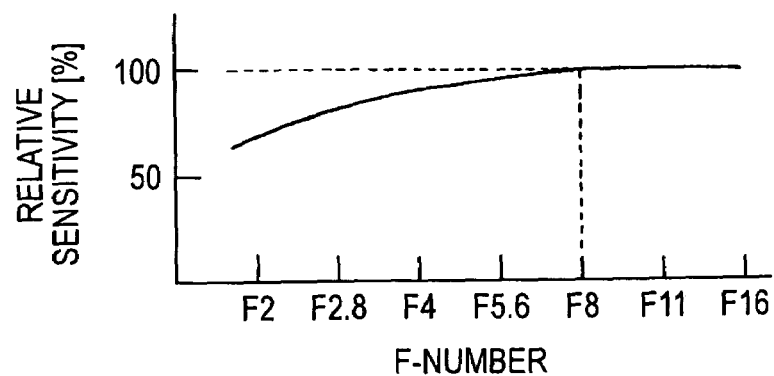
FIG. 10 is a graph for representing a relationship between a diaphragm (F-number) and a relative sensitivity of the pixel shown in FIG. 8.

As a result, in the main pixel 3, the diaphragm 12 is located on the open side. As shown in FIG. 5(a), when the confusion circle 8 is made wider than the opening 7a, a light amount loss occurs which causes the sensitivity to be lowered. When the diaphragm 12 is located on the small-stop side, as represented in FIG. 5(b), since no light amount loss occurs, the sensitivity is not lowered. As a consequence, in the main pixel 3, a relationship between the F-number and the relative sensitivity becomes similar to that of the prior art (FIG. 10), and thus, the smaller (namely open side) the F-number becomes, the larger lowering of the relative sensitivity becomes.

To the contrary, in the sub-pixel 2, when the diaphragm 12 is located to the stop side, as represented in FIG. 5(b), a light amount of incident light for the opening portion 2a of the sub-pixel 2 is considerably decreased, which causes the sensitivity to be lowered. When the diaphragm 12 is located to the open side, as shown in FIG. 5(a), since the incident light can be received by the entire area of the opening portion 2a of the sub-pixel 2, the resulting sensitivity becomes high.

Figure 6:
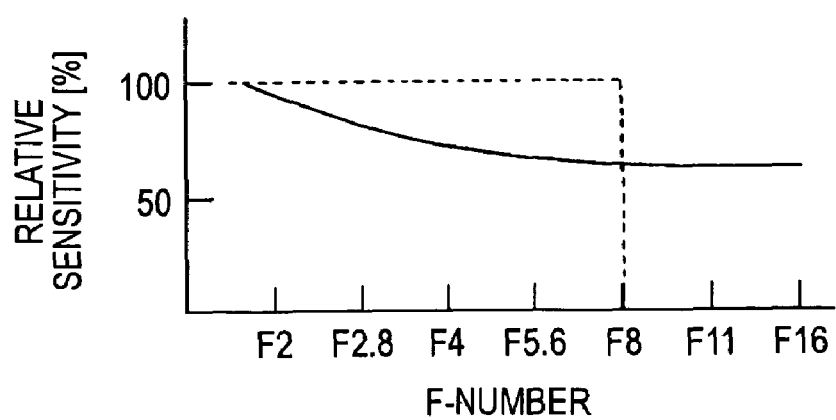
FIG. 6 is a graph for representing a relationship between a diaphragm (F-number) and a relative sensitivity of the sub-pixel indicated in FIG. 2.

In other words, as represented in FIG. 6, with respect to a relationship between the F-number of the sub-pixel 2 and the relative sensitivity, the larger the F-number becomes, namely, the larger the diaphragm 12 is closed, the lower the sensitivity is decreased. As a consequence, in such a case that a high-sensitivity image signal imaged by the main pixel 3 is synthesized with a low-sensitivity image signal imaged by the sub-pixel 2, the relationships of the relative sensitivities of the main pixel 3 and the sub-pixel 2 with respect to the diaphragm 12 must be considered.

To this end, in this first embodiment, a high-sensitivity image signal is synthesized with a low-sensitivity image signal in accordance with the above-explained expression 1. When this synthesizing process operation is carried out, the CPU 15 refers to, for example, a lookup table which has been stored in a ROM, or the like (not shown either) in response to an F-number (F-number) of the diaphragm 12 so as to read therefrom both a gain value "f1" with respect to the high-sensitivity image signal and a gain value "f2" with respect to the high-sensitivity image signal, and then outputs these gain values "f1" and "f2" to the image synthesizing process circuit 44.

In the above-described lookup table, the gain values f1 and f2 have been set as follows: That is to say, in accordance with the above-described relationship, these gain values "f1" and "f2" are defined:

(A) diaphragm 12 is set to open side (F-number is small):

main pixel 3 - - - sensitivity is lowered - - - gain value "f1" is "large";

sub-pixel 2 - - - sensitivity is increased - - - gain value "f2" is "small."

(B) diaphragm 12 is set to small-stop side (F-number is large);

main pixel 3 - - - sensitivity is increased - - - gain value "f1" is "small";

sub-pixel 2 - - - sensitivity is lowered - - - gain value "f2" is "large."

A decision how both the gain value "f1" and the gain value "f2" are increased, or decreased by using which function in response to the F-number may be determined by how to divide the pixel into the main pixel 3 and the sub-pixel 2, and also based upon such a relationship among the diaphragm 12, the opening 7a of the light shielding film 7, the main pixel 3, and the sub-pixel 2, which may therefore depend upon designs of digital cameras. If the above-explained relationship between the gain values f1 and f2 cannot be satisfied, then the sensitivity cannot be corrected under better condition.

As previously explained, in accordance with the digital camera of this first embodiment, in this digital camera on which the solid-state imaging element is mounted and owns the pixel subdivided into both the main pixel 3 and the sub-pixel 2, the sensitivity correcting process operation is carried out by considering such a fact that the sensitivity characteristics of both the main pixel 3 and the sub-pixel 2 with respect to the diaphragm 12 are different from each other. As a consequence, the synthesized image having the high image quality can be obtained.

Next, a description is made of a digital camera according to a second embodiment of the preset invention. It should be understood that although a major unit of this digital camera according to the second embodiment is identical to that of the digital camera according to the first embodiment, a different point of this digital camera is to employ the below-mentioned expression 2 instead of the above-explained expression 1.

$$\text{data} = (1-\alpha) \cdot f1 \cdot \text{high} + \alpha \cdot f2 \cdot \text{low}, \qquad \text{[Expression 2]}$$

in which symbol "α" indicates a variable used to change a synthesizing ratio of a high-sensitivity image signal to a low-sensitivity image signal.

As previously explained in the first embodiment, the closer the diaphragm 12 is located to the small-stop side, the larger the gain value "f2" becomes which is multiplied with respect to the low-sensitivity image signal read out from the sub-pixel 2.

Since the area of the sub-pixel 2 is originally small and thus the incident light amount is small, the S/N ratio of the stored electron charges is deteriorated with respect to the S/N ratio of the main pixel 3 having the large area. The larger the diaphragm 12 is closed, the larger the amount of noise mixed into the low-sensitivity image signal is increased. When such a low-sensitivity image signal mixed with the noise components is multiplied by the larger gain value "f2", the resulting noise amount becomes further larger. As a result, there is a risk that the image quality of the synthesized image is deteriorated.

As a result, in the digital camera according to this second embodiment, the larger the diaphragm 12 is closed, the smaller the synthesizing ratio of the low-sensitivity image signal when the synthesizing process operation is carried out (namely, variable "α" indicated in expression 2 is decreased) in order that the noise reducing operation may be carried out.

Figure 7:
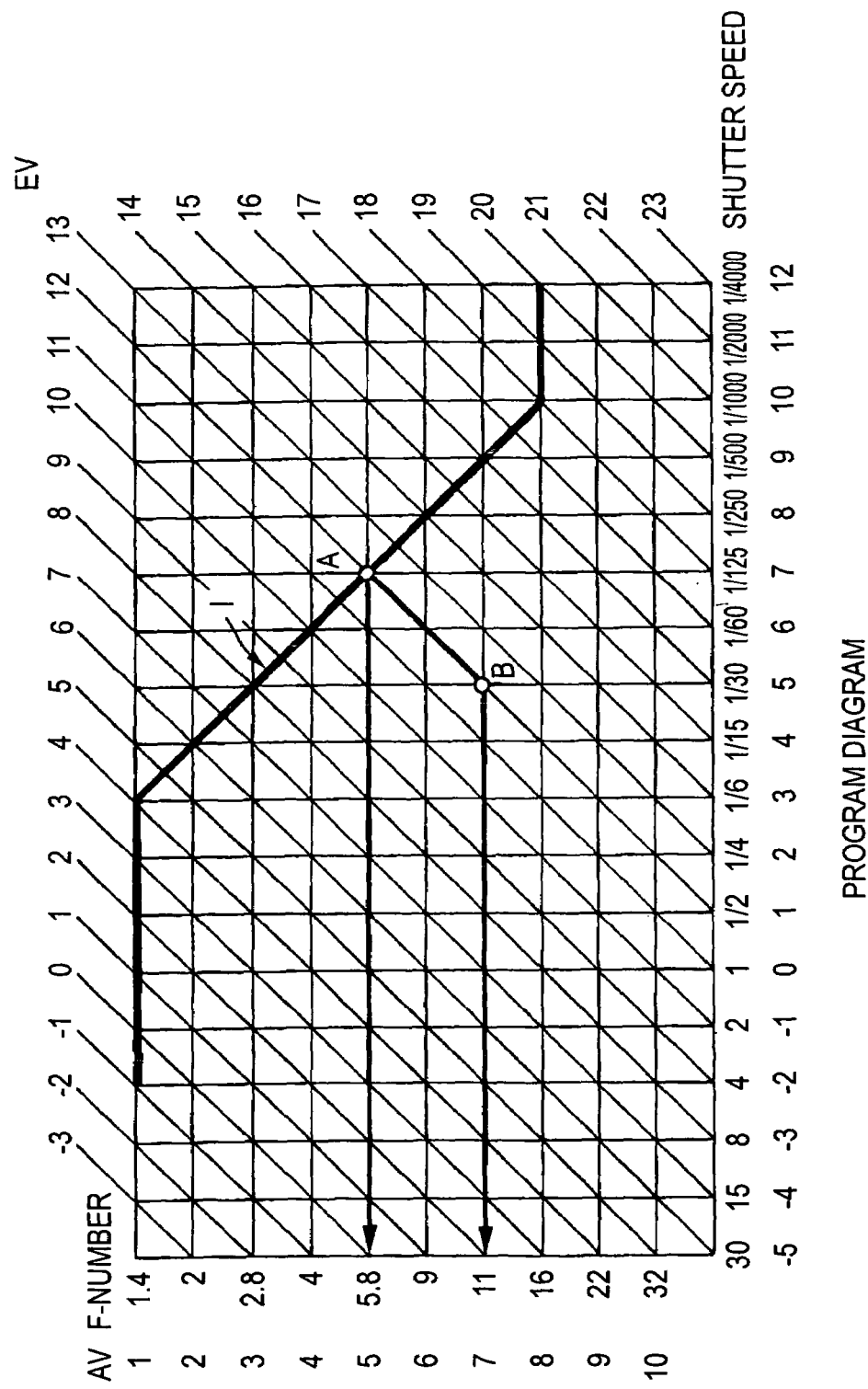
FIG. 7 is a program diagram which is mounted on a digital camera according to a second embodiment of the present invention.
Figure 8:
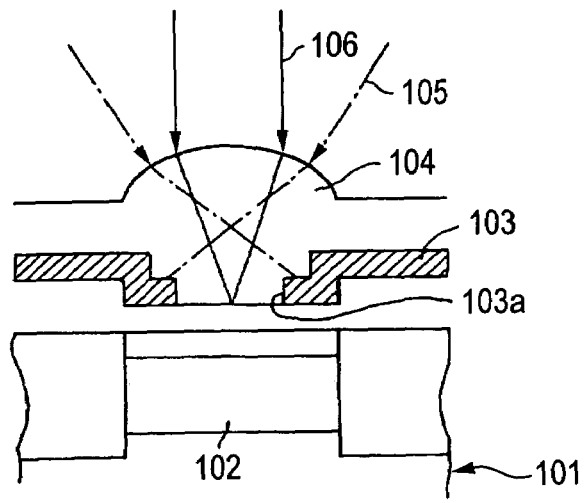
FIG. 8 is a sectional view for indicating the single pixel of the conventional solid-state imaging element.
Figure 9:
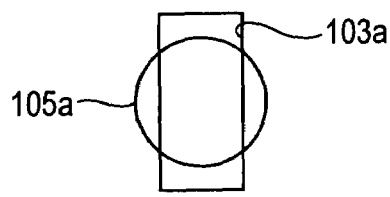
FIG. 9(a) is a diagram for representing a positional relationship between the opening of the light shielding film and the confusion circle of the incident light with respect to the single pixel shown in FIG. 8 when the diaphragm is set to the open side.
FIG. 9(b) is a diagram for representing a positional relationship between the opening of the light shielding film and the confusion circle of the incident light with respect to the single pixel shown in FIG. 8 when the diaphragm is set to the small-stop side.
Figure 9:
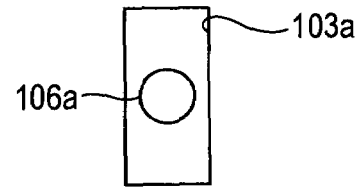

FIG. 7 is a program diagram which is mounted on this digital camera. A line "I" indicates a relationship between a diaphragm and a shutter speed in a program mode. It is now assumed that a position calculated by the CPU 15 under photographic condition corresponds to a point "A." In this point, it is so assumed that the user manipulates the operation unit 21 so as to move this point "A" to another point "B" in either a diaphragm-priority mode or a shutter-priority mode.

In this case, since the diaphragm 12 is shifted from F5.6 to F11, namely small-stop side, the above-explained gain value "f2" for the low-sensitivity image signal becomes "large." As a consequence, in this second embodiment, such a fact that the diaphragm 12 has been shifted to the small-stop side may be grasped by the CPU 15, and then this CPU 15 decreases the above-explained variable "α." Accordingly, it is possible to avoid that such a synthesized image having large noise is produced.

As previously explained, in accordance with the digital camera of this second embodiment, when the diaphragm 12 is shifted to the small-stop side, since the synthesizing ratio of the low-sensitivity image signal to the high-sensitivity image signal is lowered, the noise reduction as to the synthesized image can be improved.

In the above-described respective embodiments, the gain values "f1" and "f2" in the case of the synthesizing process operation between the high-sensitivity image signal and the low-sensitivity image signal, and also, the variable "α" of the synthesizing ratio have been described. However, as can be understood from FIG. 5(*b*), there is such a diaphragm position where no light is entered into the sub-pixel 2. Since a judgment is made that all amounts of low-sensitivity image signals become noise which are obtained when the diaphragm 12 is located at the small-stop position where no light is entered into the sub-pixel 2 as explained above, in such a case that the diaphragm 12 exceeds the F-number of this small-stop position, such a synthesized image data may be alternatively produced without using the low-sensitivity image signal, while only the high-sensitivity image signal is employed. Only in any cases other than the above-described case, the synthesizing process operation may be carried out by employing the above-explained expression 1 and expression 2. It should be noted that when the diaphragm 12 is located at the small-stop position, for example, there is no change in a relative sensitivity at a diaphragm stop position exceeding the F-number of F8 in FIG. 6.

In accordance with the present invention, the sensitivity of the image photographed by the digital camera can be corrected in correspondence with the dividing characteristic of the pixel under better condition, while this digital camera mounts the solid-state imaging element in which each of the pixels has been divided into the main pixel and the sub-pixel. Also, the digital camera can avoid such a fact that the synthesized image containing the large noise is produced.

What is claimed is:

1. A digital camera comprising:
   a diaphragm, which controls an amount of incident light by varying a stop-amount;
   a solid-state imaging element, which receives the incident light passed through the diaphragm, said solid-state imaging element having a plurality of pixels, each of the pixels being divided into a main pixel, which has a first area for obtaining a high-sensitivity image signal, and a sub-pixel, which has a second area which is smaller than the first area, for obtaining a low-sensitivity image signal;
   a controller, which individually controls a gain amount of the high-sensitivity image signal and a gain amount of the low-sensitivity image signal in response to the stop-amount of the diaphragm; and a synthesizing processor, which synthesizes the controlled high-sensitivity image signal and the controlled low-sensitivity image signal,
   wherein the controller increases the gain amount of the high-sensitivity image signal and decreases the gain amount of the low-sensitivity image signal when the diaphragm is set to an open side, whereas the controller decreases the gain amount of the high-sensitivity image signal and increases the gain amount of the low-sensitivity image signal when the diaphragm is set to a small-stop side.

2. A digital camera comprising:
   a diaphragm, which controls an amount of incident light by varying a stop-amount;
   a solid-state imaging element, which receives the incident light passed through the diaphragm, said solid-state imaging element having a plurality of pixels, each of the pixels being divided into a main pixel, which has a first area for obtaining a high-sensitivity image signal, and a sub-pixel, which has a second area which is smaller than the first area, for obtaining a low-sensitivity image signal;
   a controller, which individually controls a gain amount of the high-sensitivity image signal and a gain amount of the low-sensitivity image signal in response to the stop-amount of the diaphragm; and a synthesizing processor, which synthesizes the controlled high-sensitivity image signal and the controlled low-sensitivity image signal,
   wherein when the controller increases the gain amount of the low-sensitivity image signal, the controller decreases a synthesizing ratio of the low-sensitivity image signal synthesized with the high-sensitivity image signal.

3. A digital camera comprising:
   a diaphragm, which controls an amount of incident light by a stop-amount;
   a solid-state imaging element, which receives the incident light passed through the diaphragm, said solid-state imaging element having a plurality of pixels, each of the pixels being divided into
   a main pixel, which has a first area for obtaining a high-sensitivity image signal, and
   a sub-pixel, which has a second area, which is smaller than the first area, for obtaining a low-sensitivity image signal;
   a controller, which operates in such a manner the smaller a stop amount of the diaphragm becomes, the smaller a synthesizing ratio of the low-sensitive image signal with respect to the high-sensitive image signal is decreased; and
   a synthesizing processor, which synthesizes the high-sensitivity image signal with the low-sensitivity image signal.

4. The digital camera according to claim 3, wherein the plurality of pixels are arranged in an array shape.

5. The digital camera according to claim 3, each of the pixels is divided into the main pixel and the sub-pixel by an element separating band deviated from a center of the pixel.

6. A method for controlling a digital camera, said method comprising:

varying a stop-amount of a diaphragm to control an amount of incident light;

receiving incident light passed through the diaphragm on a solid-state imaging element, said solid-state imaging element having a plurality of pixels, each of the pixels being divided into a main pixel, which has a first area for obtaining a high-sensitivity image signal, and a sub-pixel, which has a second area which is smaller than the first area, for obtaining a low-sensitivity image signal;

individually controlling a gain amount of the high-sensitivity image signal and a gain amount of the low-sensitivity image signal in response to the stop-amount of the diaphragm; and synthesizing the controlled high-sensitivity image signal and the controlled low-sensitivity image signal, wherein said controlling step increases the gain amount of the high-sensitivity image signal and decreases the gain amount of the low-sensitivity image signal when the diaphragm is set to an open side, and said controlling step decreases the gain amount of the high-sensitivity image signal and increases the gain amount of the low-sensitivity image signal when the diaphragm is set to a small-stop side.

7. A method for controlling a digital camera, said method comprising:

varying a stop-amount of a diaphragm to control an amount of incident light;

receiving incident light passed through the diaphragm on a solid-state imaging element, said solid-state imaging element having a plurality of pixels, each of the pixels being divided into a main pixel, which has a first area for obtaining a high-sensitivity image signal, and a sub-pixel, which has a second area which is smaller than the first area, for obtaining a low-sensitivity image signal;

individually controlling a gain amount of the high-sensitivity image signal and a gain amount of the low-sensitivity image signal in response to the stop-amount of the diaphragm; and synthesizing the controlled high-sensitivity image signal and the controlled low-sensitivity image signal, wherein when said controlling step increases the gain amount of the low-sensitivity image signal, the controlling step decreases a synthesizing ratio of the low-sensitivity image signal synthesized with the high-sensitivity image signal.

8. A method of controlling a digital camera, said method comprising:

setting a stop-amount of a diaphragm to control an amount of incident light;

receiving the incident light passed through the diaphragm on a solid-state imaging element, said solid-state imaging element having a plurality of pixels, each of the pixels being divided into a main pixel, which has a first area for obtaining a high-sensitivity image signal, and a sub-pixel, which has a second area, which is smaller than the first area, for obtaining a low-sensitivity image signal;

controlling a synthesizing ratio of the low-sensitivity signal with respect to the high-sensitivity image signal, such that the smaller a stop amount of the diaphragm becomes, the smaller a synthesizing ratio of the low-sensitivity image signal with respect to the high-sensitivity image signal is decreased; and synthesizing the high-sensitivity image signal with the low-sensitivity image signal.

9. The method according to claim 8, wherein the plurality of pixels are arranged in an array shape.

10. The method according to claim 8, wherein each of the pixels is divided into the main pixel and the sub-pixel by an element separating band deviated from a center of the pixel.

* * * * *